Patented May 22, 1934

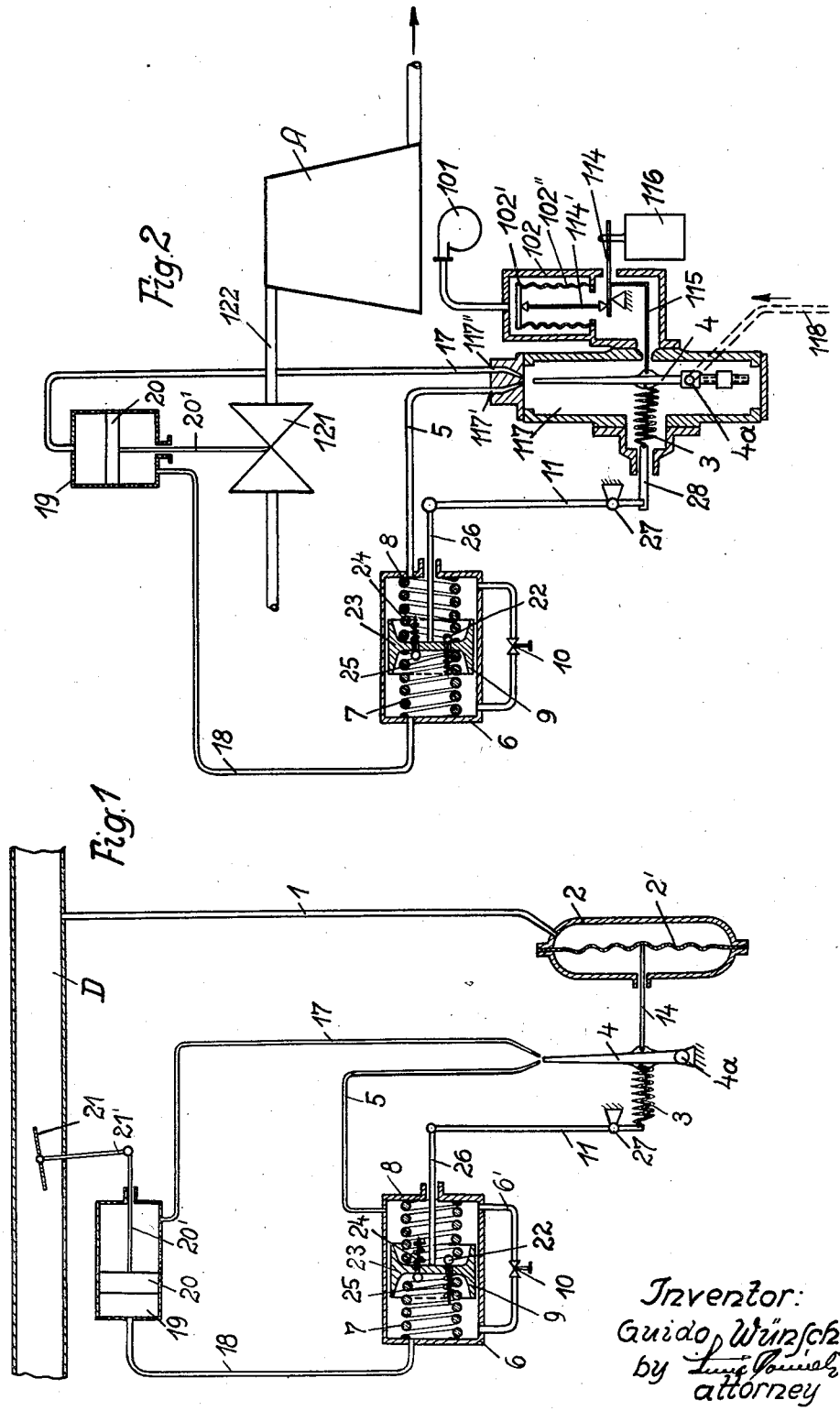

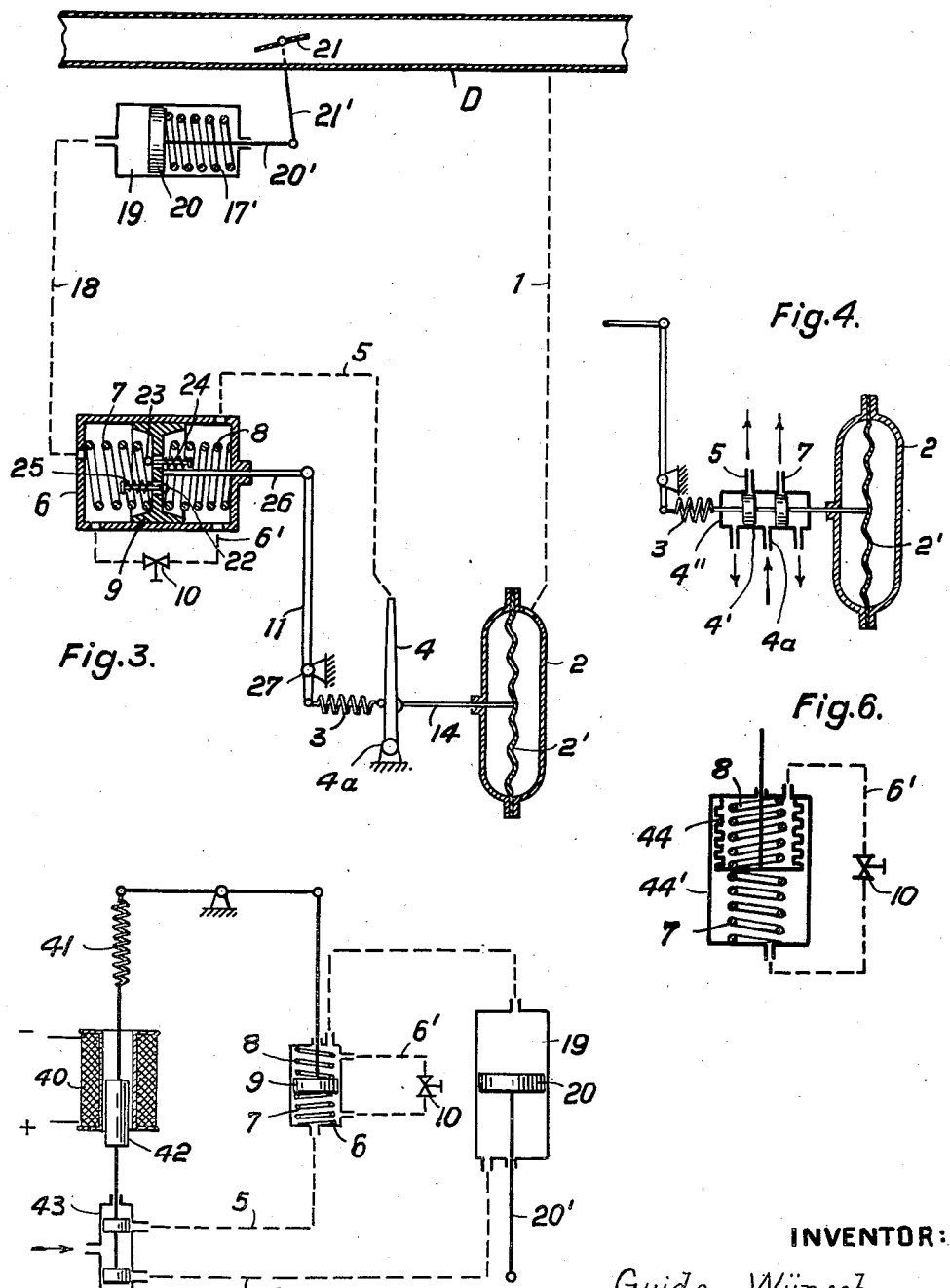

1,959,889

UNITED STATES PATENT OFFICE 1,959,889

DEVICE FOR COMPENSATING A DEFLECTION OF A CONTROL MEMBER WHICH HAS BEEN AFFECTED BY A CHANGE IN THE IMPULSE VALUE

Guido Wünsch, Steglitz, near Berlin, Germany

Application May 22, 1929, Serial No. 365,151
In Germany June 4, 1928

10 Claims. (Cl. 137—78)

With certain regulation actions or procedures, especially in the case of regulating pressures, but also when numbers of revolutions, and the like, are to be regulated, it is indispensably requisite to move the regulating member operated by the regulating impulse to compensate any deflection of a control member which has been affected by a change in the impulse value. That is requisite, for instance, if, owing to the masses or the like to be accelerated, a comparatively long time elapses until a new adjustment has been effected by the respective regulating action or procedure, that adjustment being intended to compensate any deflecting of a control member which has been affected by a change in the impulse value.

The present invention relates to an arrangement and combination of parts by which the result of the control impulse is instantaneously compensating but which nevertheless permits carrying out completely the regulating procedure. The invention can be employed and is particularly useful for the regulation of pressures, but can be used also for regulating numbers of revolution in order to maintain a certain definite number of revolutions independent of the performance of the machine regulated by the means designed according to this invention.

The invention is illustrated diagrammatically and by way of example on the accompanying drawings on which figure 1 is a diagrammatic view partly in section of an apparatus for the regulation of pressures, Fig. 2 is a similar view of an apparatus for the regulation of numbers of revolution, Fig. 3 is a similar view of Fig. 1 showing a modified construction, Fig. 4 is a part sectional view of a modified detail, Fig. 5 is a diagrammatic view of further modified details, and Fig. 6 is a sectional diagrammatic view of another modified detail.

In Fig. 1 D denotes a pipe through which a liquid under pressure is flowing. The object is to regulate that pressure. In order to obtain a control impulse the pressure existing in the pipe D is transmitted through a pipe 1 into a casing 2 in which a diaphragm 2' is housed, the movements of which are transmitted by a rod 14, to a turntable arm 4 hinged at 4ª to any suitable stationary part of the device. The arm 4 is tubular and is connected by its suitably designed joint 4ª which is hollow with a receptacle (not shown) containing compressed air or a gas or an oil under pressure, the respective fluid being supplied from that receptacle to the tubular arm 4 by the intermediary of the hollow joint 4ª. The hollow arm 4 serves in known manner as a jet-tube; opposite its orifice are the open ends of two pipes 5 and 17, the other ends of which are connected with the two chambers of a cylinder 19 in which a piston 20 is enclosed. The piston 20 is connected with a throttle valve 21 by means of the piston rod 20' and an arm 21'. The cylinder 19 is directly connected with the pipe 17, but its connection with the pipe 5 is indirect, viz. by the intermediary of a pipe 18 and a certain mechanism inserted between the pipes 18 and 5. This mechanism is described hereinafter.

It is obvious that the throttle valve 21 can be adjusted by the piston 20, and that the position of this piston depends upon the position of the jet pipe 4. The arrangement and combination of parts described in the preceding paragraph is known, but co-operates with another, new arrangement and combination of parts, or with a certain new mechanism or device respectively which constitutes the subject matter of the present invention. This mechanism or device is designed as follows:

The pipes 5 and 18 are connected with one another by a cylinder 6 in which a piston 9 is enclosed. This piston is normally held in its medium position by two helical springs 7 and 8. The two chambers in the cylinder 6 are connected with one another by a pipe 6' into which a delicate valve 10, preferably a needle valve, is inserted. Two small valves 22 and 23, preferably ball valves, are inserted into the piston 9; they are non-return valves, of which the one opens into the one chamber of the cylinder 6 and the other into the other chamber thereof. From the one ball extends a thin spindle 24 into the other chamber, and reversely thereto a thin spindle 25 extends from the other ball into the other chamber, and thin helical closing springs encompass, and are connected with, these spindles. These latter extend a little over the axial length of the piston 9, so that either ball valve is opened shortly prior to the piston arriving at the end of its stroke in the respective direction, the two chambers communicating then with one another and the pressures in them being equalized.

The piston rod 26 is jointed to one arm of a double-armed lever 11, the arms of which are of very different length. The piston rod 26 is connected with the longer arm of said lever 11, whereas the shorter arm is connected with one end of a helical spring 3, the other end of which is connected with the movable jet-pipe 4, this latter being, thus, subjected on one side to the action of the spring and on the other side to the action of the diaphragm 2.

The manner of operation of the whole is as follows:

Supposing, the pressure in the pipe D has, for any reason, increased, that increase will be transmitted into the casing 2 by means of the tube 1, and thus also to the diaphragm 2', and further by the rod 14 to the jet tube 4. As this tube is now being turned to the left the fluid under pressure escaping from the jet tube will enter more into the pipe 5 than into the pipe 17, in consequence whereof the piston 9 in the cylinder 6 will be correspondingly shifted to the left. The valve 10 is so adjusted that a certain part-equalization of the pressures in the two cylinder chambers takes place already through the pipe 6', and as the pressure in the lefthand chamber of the cylinder 6 correspondingly increases, the same takes place in the lefthand chamber of the cylinder 19, in consequence whereof the piston 20 is shifted to the right and the flap 21 is turned correspondingly, viz. in such a direction that the fluid passing through the pipe D is throttled, the pressure in it being thereby reduced to its normal height.

The amount of air or gas passing through the needle valve from the righthand chamber of the cylinder to the lefthand chamber is, however, only very small. But when the piston 9 is being shifted in the cylinder 6, also this movement causes an increase of the pressure in the lefthand chamber of the cylinder 6, and at the same time the piston rod 26 turns the lever 11 in such a direction that the spring 3 is somewhat compressed. This pressure is transmitted to the jet tube 4 which is turned thereby to the right, viz. back into its initial or normal position.

The cylinders 6 and 19 are preferably filled with a liquid substance, for instance a suitable oil. Owing to the resistance which the oil or other liquid substance presents by reason of its inertia the equalization and the regulation proceed gradually and any oscillating action and super-regulation is perfectly prevented.

If the pressure supplied through the pipe 5 should increase so much that the piston 9 approaches the end of its path to the left the ball valve 22 will be opened automatically just prior to the piston reaching the end of its path and the pressures in the two cylinder chambers will now at once be equalized, the piston returning thereupon into its normal position in the middle of the cylinder under the pressure of the compressed spring 7. Simultaneously therewith also the pressure fluid supplying means or jet tube 4 will be moved back into its normal position by the members 11 and 3, as already described.

In the modification shown in Fig. 2 the intention is to regulate the number of revolutions of an engine. Those parts which correspond to like parts in Fig. 1 are designated with the same reference numerals as in Fig. 1. In Fig. 2 A denotes an engine, for instance a steam turbine, the number of revolutions of which is to be regulated. The engine A is coupled with a rotary pump 101, the number of revolutions of which is the same as that of the engine A. The pump 101 communicates with a vessel 102 enclosing a disk 102' and a diaphragm 102". The pressure exerted upon said disk is transmitted by a rod 114' to a double-armed lever 114, the arms of which are differently long, and from the longer arm of which a weight 116 is suspended. The movements of the lever 114 are transmitted by a member 115 to a jet tube 4 which is also subjected to the action of the spring 3, just as in Fig. 1. The other end of this spring is connected with the lever 11 not directly but by the medium of a transmitting member 28 which extends into a casing 117 enclosing the jet tube and the spring. The dotted line 118 denotes the pipe through which a fluid under pressure is conducted to the jet tube in order to be blown into one or the other of two passages 117' and 117" provided in the top of the casing 117 and connected with the pipes 5 and 17 which are practically the same as the pipes 5 and 17 in Fig. 1.

The piston rod 20' is connected in this example not with a throttle flap, but with a throttle valve 121 arranged in the steam supply pipe 112 for the turbine A.

The manner of operation is practically the same as in Fig 1. When the number of revolutions of the turbine falls from any reason and, therefore, also the number of revolutions of the pump 101 becomes correspondingly lower, the disk 102' and the diaphragm 102" will give way and the lever 114 will be turned by the weight 116 so that also the jet pipe, as well as the lever 11, are actuated. The fluid under pressure blown through the jet pipe is now blown chiefly into the pipe 17 so as to act upon the piston 20, and the action of this piston upon the throttle valve 121 is damped and regulated by the cylinder 6, the piston 9, and the other appertaining members in exactly the same manner as has already been described with respect to Fig. 1.

Fig. 3 shows another modification of the device according to my invention. In this case the auxiliary motor 19, 20 is actuated by means of a spring 17' arranged on the right-hand side of the piston 20 only, so that the pipe 17 of Fig. 1 can be dispensed with. This device operates as follows:

If the pressure in the pipe D increases, the diaphragm 2' is bent to the left and swings the hollow arm 4 to the left also, so that more pressure oil will enter into the tube 5. The piston 9 will therefore move to the left and will cause the oil to go through the pipe 18 into the cylinder 19 on the lefthand side of the piston 20, which will then move to the right compressing thereby the spring 17' and closing the throttle valve 21.

The hollow arm 4 is moved backward by means of the piston 9 in the cylinder 6 whereupon the piston moves to the right in the same way as in the modifications shown in Figs. 1 and 2. If the pressure in the pipe D is falling, the diaphragm 2' will yield to the pressure of the spring 3, so that the hollow arm 4 will swing to the right. The pipe 5 will receive then less pressure oil and the pressure acting on the righthand side of the piston 9 will also fall so that the spring 17' will be able to press the piston 20 in the cylinder 19 to the left, thereby opening the throttle valve 21, in the same way as shown in Figs. 1 and 2. The arrangement is obviously such that in its extreme position on the lefthand side the hollow arm 4 alines with the opening of the pipe 5 for. Abutments for the arm 4 can also be provided for.

In the modification of the device according to my invention shown in Fig. 4, the turnable arm 14 is substituted by an ordinary regulating valve 4', which reciprocates in the cylinder 4". During the reciprocation of the diaphragm 2' in the casing 2 the regulating valve 4' is also reciprocated in spite of the pressure of the spring 3 and connects either the pipe 5 or the pipe 17 with the oil feeding pipe 4a. By connecting the pipes 5 and 17 to the corresponding pipes an arrangement similar to that shown in Fig. 1 is produced which works exactly in the same way.

Fig. 5 shows a modification of my invention in use with electrical generators, by means of which the voltage can be regulated. The electrical circuit is connected with a coil 40, which creates a magnetic field and attracts an armature 42 suspended on a spring 41 with a force depending on the amount of voltage. The armature 42 is connected with a slide valve gear 43 regulating the flow of oil to the pipes 5 and 17. The other parts of this device correspond to those shown in Fig. 1. Obviously the oil regulates the position of the piston 20 in the cylinder 19, so that the regulation is effected by means of the piston rod 20'.

In the modification shown in Fig. 6 the piston 9 of the cylinder 6 with the springs 7 and 8 acting upon both sides of the piston of Fig. 5 is substituted by a diaphragm, which may have the form of a corrugated flue piston 44 arranged within a box 44'. Within and without the piston 44 springs 7 and 8 are arranged which attempts to keep it in a middle position. The circulating pipe 6 can be provided with a needle valve 10 to connect the interior of the piston 44 with the box 44'.

I wish it to be understood that I do not limit myself to the examples shown and described. It will be obvious to every expert that the invention allows of a variety of applications, especially in connection with such devices, apparatus, machines and engines, in which a control member or regulation member must be moved back into its normal or initial position after the regulation has been effected. A particular advantage which the invention presents is that the controlling device is independent of the controlled member (for instance independent of the throttle members 21 and 121, Figs. 1 and 2) so that the control device can be put up at any suitable or desired place. Also the details of the control device are not limited to those shown in the examples.

I claim:

1. A device for compensating a deflection of a control member which has been affected by a change in the impulse value, comprising, in combination with a member to be regulated, a piston connected with said member, and a cylinder enclosing this piston; an oscillable jet pipe through which a fluid under pressure can be blown; two pipes extending from the orifice of said jet pipe to the two chambers of said cylinder; another cylinder inserted into one of said pipes, and a piston in this cylinder; and means for transmitting motion from this piston to the said jet-pipe.

2. A device for compensating a deflection of a control member which has been affected by a change in the impulse value, comprising, in combination with a member to be regulated, a piston connected with said member, and a cylinder enclosing this piston; means for conducting a fluid under pressure into the two chambers of said cylinder; another cylinder inserted into one of said conducting means, and a piston in this cylinder; an outer connection between the two chambers in this cylinder, and a valve in this connection; and means for varying automatically the amount of the fluid under pressure to be conducted into the chambers of the first-mentioned cylinder.

3. A device for compensating a deflection of a control member which has been affected by a change in the impulse value, comprising, in combination with a member to be regulated, a piston connected with said member, and a cylinder enclosing this piston; an oscillable jet pipe through which a fluid under pressure can be blown; two pipes extending from the orifice of said jet pipe to the two chambers of said cylinder; another cylinder inserted into one of said pipes, and a piston in this cylinder; an outer connection between the two chambers in this cylinder, and a valve in this connection; and means for varying automatically the amount of the fluid under pressure to be conducted into the chambers of the first-mentioned cylinder.

4. A device for compensating a deflection of a control member which has been affected by a change in the impulse value, comprising, in combination with a member to be regulated, a piston connected with said member, and a cylinder enclosing this piston; an oscillable jet pipe through which a fluid under pressure can be blown; two pipes extending from the orifice of said jet pipe to the two chambers of said cylinder; another cylinder inserted into one of said pipes, and a piston in this cylinder; springs arranged in the two chambers of this cylinder and bearing on the two faces of the piston and tending to keep it in the middle portion of the said cylinder; an outer connection between the two chambers in this cylinder, and a valve in this connection; and means for varying automatically the amount of the fluid under pressure to be conducted into the chambers of the first-mentioned cylinder.

5. A device for compensating a deflection of a control member which has been affected by a change in the impulse value, comprising, in combination with a member to be regulated, a piston connected with said member, and a cylinder enclosing this piston; an oscillable jet pipe through which a fluid under pressure can be blown; two pipes extending from the orifice of said jet pipe to the two chambers of said cylinder; another cylinder inserted into one of said pipes, and a piston in this cylinder; two non-return valves arranged in this piston and adapted to be opened in opposite directions by the end faces of the said cylinder; an outer connection between the two chambers in this cylinder, and a valve in this connection; and means for varying automatically the amount of the fluid under pressure to be conducted into the chambers of the first-mentioned cylinder.

6. A device for compensating a deflection of a control member which has been affected by a change in the impulse value, comprising, in combination with a member to be regulated, a piston connected with said member, and a cylinder enclosing this piston; an oscillable jet pipe through which a fluid under pressure can be blown; two pipes extending from the orifice of said jet pipe to the two chambers of said cylinder; another cylinder inserted into one of said pipes, and a piston in this cylinder; springs arranged in the two chambers of this cylinder and bearing on the two faces of the piston and tending to keep it in the middle portion of the said cylinder; two non-return valves arranged in this piston and adapted to be opened in opposite directions by the end faces of the said cylinder; an outer connection between the two chambers in this cylinder, and a valve in this connection; and means for varying automatically the amount of the fluid under pressure to be conducted into the chambers of the first-mentioned cylinder.

7. The combination with a regulator for regulating physical conditions, of fluid pressure responsive operating means for said regulator; means to supply pressure fluid to said operating means; controlling means to adjust said pressure fluid supplying means, variably to control the fluid pressure operation of said operating means responsive to variations in the condition to be regulated by said regulator; and fluid pressure responsive means, actuated by fluid pressure from said pressure fluid supplying means for compensating adjustment of said pressure fluid supplying means by said controlling means, said operating means and said compensating means being supplied in series by pressure fluid from said pressure fluid supplying means.

8. The combination of a regulator for regulating physical conditions with a cylinder; a piston movable in said cylinder and connected to said regulator for operating the latter; a second cylinder; a piston movable in said second cylinder; means to supply pressure fluid to each of said cylinders at one side of the piston of each, said cylinders communicating with each other at the other sides of their pistons; controlling means to adjust said pressure fluid supplying means variably to control the fluid pressure operation of said first named cylinder responsive to variations in the condition to be regulated; operating means between the piston of said second cylinder and said pressure fluid supplying means; and means to move said piston of said second cylinder and through said operative means to compensate adjustment of said pressure fluid supplying means by said controlling means.

9. The combination of a regulator for regulating physical conditions with a cylinder; a piston movable in said cylinder and connected to said regulator for operating the latter; a second cylinder; a piston movable in said second cylinder; means to supply pressure fluid to each of said cylinders at one side of the piston of each, said cylinders communicating with each other at the other sides of their pistons; controlling means to adjust said pressure fluid supplying means variably to control the fluid pressure operation of said first named cylinder responsive to variations in the condition to be regulated; operating means between the piston of said second cylinder and said pressure fluid supplying means; and resilient means in said second cylinder to move the piston thereof and through said operating means to compensate adjustment of said pressure fluid supplying means by said controlling means.

10. The combination of a regulator for regulating physical conditions with a cylinder; a piston movable in said cylinder and connected to said regulator for operating the latter; a second cylinder; a piston movable in said second cylinder; means to supply pressure fluid to each of said cylinders at one side of the piston of each, said cylinders communicating with each other at the other sides of their pistons; controlling means to adjust said pressure fluid supplying means variably to control the fluid pressure operation of said first named cylinder responsive to variations in the conditions to be regulated; operating means between the piston of said second cylinder and said pressure fluid supplying means; means to move said piston of said second cylinder and through said operative means to compensate the adjustment of said pressure fluid supplying means by said controlling means; and a passage connecting the chambers of said second cylinder at opposite sides of the piston of the latter.

GUIDO WÜNSCH.